(12) United States Patent
Rubin (10) Patent No.: US 10,719,661 B2
(45) Date of Patent: Jul. 21, 2020

(54) METHOD, DEVICE, AND SYSTEM FOR COMPUTER-BASED CYBER-SECURE NATURAL LANGUAGE LEARNING

(71) Applicant: THE UNITED STATES OF AMERICA AS REPRESENTED BY THE SECRETARY OF THE NAVY, San Diego, CA (US)

(72) Inventor: Stuart H. Rubin, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 258 days.

(21) Appl. No.: 15/981,747

(22) Filed: May 16, 2018

(65) Prior Publication Data

US 2019/0354587 A1 Nov. 21, 2019

(51) Int. Cl.
| | | |
|---|---|---|
| G06F 17/27 | (2006.01) | |
| G06F 17/21 | (2006.01) | |
| G06F 40/30 | (2020.01) | |
| G06F 16/84 | (2019.01) | |
| G06F 16/31 | (2019.01) | |
| G06F 40/40 | (2020.01) | |

(52) U.S. Cl.
CPC ............ *G06F 40/30* (2020.01); *G06F 16/313* (2019.01); *G06F 16/325* (2019.01); *G06F 16/84* (2019.01); *G06F 40/40* (2020.01)

(58) Field of Classification Search
CPC ...... G06F 40/30; G06F 40/284; G06F 16/248; G06F 40/205; G06F 16/325
See application file for complete search history.

(56) References Cited

U.S. PATENT DOCUMENTS

| | | | |
|---|---|---|---|
| 7,047,226 B2 | 5/2006 | Rubin | |
| 7,295,496 B2 | 11/2007 | Moczygemba | |
| 7,600,007 B1 * | 10/2009 | Lewis | G06Q 10/04 709/223 |
| 7,665,063 B1 * | 2/2010 | Hofmann | G06F 8/311 717/111 |
| 8,103,600 B1 * | 1/2012 | Rubin | G06N 5/02 706/11 |
| 8,155,949 B1 * | 4/2012 | Rubin | G06F 16/24564 704/9 |
| 8,285,728 B1 | 10/2012 | Rubin | |
| 8,315,956 B2 | 11/2012 | Vashist | |
| 8,447,720 B1 * | 5/2013 | Rubin | G06N 5/025 706/52 |

(Continued)

OTHER PUBLICATIONS

Armella et al. "Knowledge acquisition from corresponding domain knowledge transformations." 2009, IEEE International Conference on Information Reuse & Integration. IEEE, 2009, pp. 175-181.*

(Continued)

*Primary Examiner* — Olujimi A Adesanya
(74) *Attorney, Agent, or Firm* — Naval Information Warfare Center, Pacific; Kyle Eppele; J. Eric Anderson (57) ABSTRACT

A computing device learns a natural language. A mapper included in the computing device non-deterministically maps an input natural language sentential form to a matching semantic that is associated with a computer language function component. A translator included in the computing device translates the matching semantic into a translated natural language sentential form.

10 Claims, 5 Drawing Sheets

(56) References Cited

U.S. PATENT DOCUMENTS

| | | | |
|---|---|---|---|
| 8,489,648 | B1 | 7/2013 | Rubin |
| 10,482,181 | B1* | 11/2019 | Rubin ................. G06F 16/2457 |
| 2002/0178005 | A1 | 11/2002 | Dusan et al. |
| 2007/0124263 | A1 | 5/2007 | Katariya et al. |
| 2009/0299992 | A1* | 12/2009 | Klinger ............ G06F 16/90335 |
| 2011/0270820 | A1* | 11/2011 | Agarwal ............... G06F 16/951 707/709 |
| 2015/0293976 | A1* | 10/2015 | Guo ..................... G06F 16/248 707/706 |
| 2017/0039374 | A1* | 2/2017 | Rubin .................. G06F 16/245 |
| 2017/0228365 | A1* | 8/2017 | Levy ....................... G06F 16/36 |
| 2017/0371861 | A1 | 12/2017 | Barborak et al. |

OTHER PUBLICATIONS

Rubin et al, "Geodesic search and retrieval of semi-structured databases." 2007. IEEE International Conference on Systems, Man and Cybernetics. IEEE, 2007, pp. 3396-3401.*

Rubin et al, "A natural language interface for an intelligent universal situational awareness (USA) system." 2003, The 12th IEEE International Conference on Fuzzy Systems, 2003. FUZZ'03 . . . vol. 2. IEEE, 2003, pp. 1261-1267.*

Lombera et al, "A Graphics-User Interface in Support of a Cognitive Inference Architecture.", 2008, In CAINE, pp. 274-279. 2008.*

Rubin et al, "On Heuristic Randomization and Reuse as an Enabler of Domain Transference", IEEE International Conference on Information Reuse and Integration (IRI), Aug. 2015.

Mccaney, "New Project Wants AI to Explain Itself", https://defensesystems.com/articles/2016/08/11/xai-darpa-explainable-artificial-intelligence.aspx, Aug. 11, 2016.

Lecun, "What's Wrongwith Deep Learning?", http://www.pamitc.org/cvpr15/files/lecun-20150610-cvpr-keynote.pdf, Jun. 10, 2015.

Rubin et al. "KASER: Knowledge Amplification by Structured Expert Randomization", IEEE Transactions on Systems, Man, and Cybernetics—Part B: Cybernetics, vol. 34, No. 6, Dec. 2004.

Chaitin, "Randomness and Mathematical Proof", Scientific American 232, No. 5, pp. 47-52, May 1975.

* cited by examiner

METHOD, DEVICE, AND SYSTEM FOR COMPUTER-BASED CYBER-SECURE NATURAL LANGUAGE LEARNING

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 104782.

FIELD OF THE INVENTION

The present disclosure pertains generally to natural language learning. More particularly, the present disclosure pertains to computer-based natural language learning.

BACKGROUND OF THE INVENTION

Artificial intelligence systems include expert systems and case-based systems. An expert system is a computer system that emulates the decision-making ability of a human expert. Expert systems are designed to solve complex problems by reasoning through bodies of knowledge, represented as a segmented base of if—then rules, where there is no other explicit connection among the rules.

Case-based systems model events and their causalities using situation-action codes. These systems solve new problems based on the solutions of similar past problems.

In both expert system and case-based systems, similar cases cannot be predicted but can only be acquired experientially. As a result, in both conventional expert- and case-based systems, all acquired knowledge is mutually random. Neither expert-based systems nor case-based systems express knowledge using natural language. This means that the representation of knowledge by these systems is neither easy to understand or extend. Moreover, the representation of knowledge by these systems is not amenable to metaphorical explanation, which is why context-free expert systems only provide literal explanations (i.e., the rule, which, when fired, leads to the stated conclusions).

While methodologies have been proposed for computational natural language understanding based on hidden-layer neural networks, they cannot learn and cannot retain all the fundamental memories.

Rule-based approaches to natural language processing need to deal with the fact that there are more exceptions than rules. Rule-based approaches have not been successful in learning these exceptions to date. Nevertheless, attempts have been made to overcome this limitation through the use of brute force (i.e., hand-coding virtually everything which a person might ask in a specific domain). Such approaches do not benefit from domain transference. Thus, they could never pass the Turing Test if one moves slightly askew of the domain of discourse.

In view of the above, it would be desirable to address shortcomings of conventional computer-based systems and neural network systems in learning natural language.

SUMMARY OF THE INVENTION

According to an illustrative embodiment, a computing device learns a natural language. A mapper included in the computing device non-deterministically maps an input natural language sentential form to a matching semantic that is associated with a computer language function component. A translator included in the computing device translates the matching semantic into a translated natural language sentential form.

These, as well as other objects, features and benefits will now become clear from a review of the following detailed description, the illustrative embodiments, and the accompanying drawings.

BRIEF DESCRIPTION OF THE DRAWINGS

Features of illustrative embodiments will be best understood from the accompanying drawings, taken in conjunction with the accompanying description, in which similarly-referenced characters refer to similarly-referenced parts, and in which.

DETAILED DESCRIPTION OF THE EMBODIMENTS

According to illustrative embodiments, an intelligent computing device, system, and method are provided for learning a natural language. Natural language (NL) sentential forms, such as questions and statements, are non-deterministically mapped to matching semantics having associated computer language function components, querying external systems as needed. The matching semantics are translated into NL sentential forms. Thus, a NL knowledge base is acquired by learning through interaction with domain experts. This results in intelligent NL conversational discourse, learning, and computer language function component programming. The cost of knowledge acquisition is minimized through the representation and translation of knowledge expressed in NL.

Figure 1:
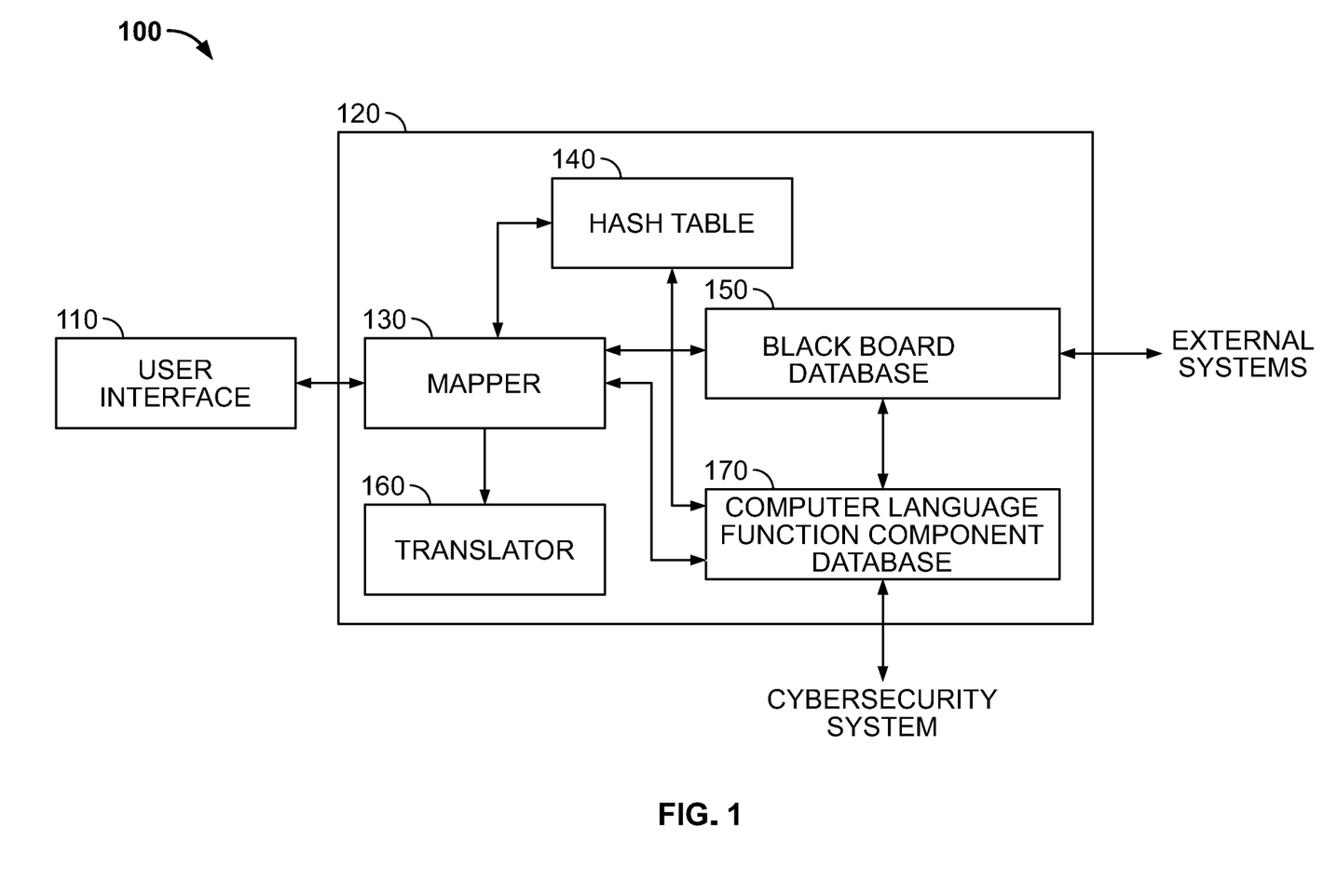
FIG. 1 illustrates an example architecture of a cyber-secure computer-based natural language learning expert system according to an illustrative embodiment.

FIG. 1 illustrates an example architecture of a cyber-secure natural language learning computer-based expert system according to an illustrative embodiment. As shown in FIG. 1, the system 100 includes a computing device 120 and a user interface 110. The user interface 110 is configured to receive input NL sentential forms from one or more users and provide the input NL sentential forms to the computing device 120 via any suitable wired or wireless connection. The computing device 120 is configured to translate the input NL sentential forms from one or more users into translated NL sentential forms. The user interface 110 is further configured to receive the translated NL sentential forms and output the translated sentential forms for verification and/or correction by the user(s). The computing device 120 may be implemented in a device, such as the computing device 400 illustrated in FIG. 4 and described below. The user interface 110 may be implemented with any suitable user interface, such as a microphone, a keypad, a touchscreen, etc. The user interface 110 may be included, for example, in a handheld computing device, a personal computer, etc.

As shown in FIG. 1, the computing device 120 includes a mapper 130, a hash table 140, a blackboard database 150, a translator 160, and a computer language function component database 170. The mapper 130 is configured to receive NL sentential forms, including statements and/or questions, from the user interface 110. The NL sentential forms are context-free and non-deterministic. The mapper 130 is further configured to non-deterministically map the NL sentential forms (including subsequences of the sentential form, such as words or phrases) many-to-one with a matching semantic. That is, many different NL sentential forms are mapped to a common matching semantic. Thus, the meaning of many NL sentential forms can be understood by a common semantic to which the NL sentential forms are mapped.

The mapper 130 is configured to perform non-deterministic mapping of an input NL sentential form to a matching semantic by first querying the hash table 140. The hash table 140 is configured to store associations of NL sentential forms and semantics, the semantics being associated with computer language function components. The semantics include situation semantic objects paired many-to-many with action semantic objects. Every action semantic object has one or more preimages in the situation semantic objects. Each of the situation semantic objects and the action semantic objects are associated with computer language function components, and these associations are also stored in the hash table 140.

The computer language function components may be recursively specified as functions of functions. Hence, subfunctions can be specified using NL and retrieved in the same manner as the functions. The computer language function components may be manually specified and associated where unknown. The result is a convergence upon NL programming. The computer language function component database 170 is configured to store the computer language function components, such components also being stored in association with situation semantic objects and the action semantic objects in the hash table 140. The computer language function components are stored in the computer language function component database 170 for use by a cybersecurity system, as explained in detail below.

Referring again to FIG. 1, the blackboard database 150 is configured to store context information corresponding to semantics. The mapper 130 is configured to query the blackboard database 150 for context information corresponding to the matching semantic if the mapper 130 does not find a matching semantic for an input NL sentential form in the hash table 140. The mapper 130 may reduce the input NL sentential form to subsequences, e.g., words or phrases, and query the blackboard database 150 for context information corresponding to semantics that respectively match the subsequences. The blackboard database 150 is configured to store context information in the form of situation semantic objects and action semantic objects that are posted and retracted by computer language function components associated with the situation semantic objects and the action semantic objects.

The mapper 130 is further configured to query external systems, including users and/or intelligent computer systems, for context information if the blackboard database 150 does not contain context information related to the matching semantic(s). The context information is then posted to the blackboard database 150. Such queries may be made via any suitable wired or wireless connection.

For example, consider an input NL sentential form "Do I need to dress for bad weather today?". The situation semantic object associated with the situation "bad weather" may be associated with a computer language function component indicating that if humidity is greater than 100%, and the wind speed is greater than thirty (30) miles per hour (mph), the situation "bad weather" is true. The computer language function component may further indicate that otherwise, the situation "not bad weather" is true. If there is no context information in the blackboard database 150 that corresponds to "bad weather", the mapper 130 mapper may cause the computer language function component to query an external system for the humidity and wind speed. The retrieved humidity and wind speed are then posted to the blackboard database 150 as context information.

If the retrieved humidity is equal to 100%, and the wind speed is 30 mph, the situation "bad weather" is true. The situation semantic object is then hashed or paired with an action semantic object among many possible action semantic objects associated with "bad weather", such as action semantic objects indicating that the user should be instructed to "Bring an umbrella" or "Wear a raincoat". The action semantic object that is selected from among the many action semantic objects is posted to the blackboard database 150. For example, if the action semantic object instructing the user to "Bring an umbrella" is selected, the blackboard database 150 would contain context information indicating that the weather is bad and the user has an umbrella.

If the retrieved humidity is less than 100%, and/or the wind speed is less than 30 mph, the situation "bad weather" is not true. In this case, the situation semantic object would not be paired with the action semantic object instructing the user to "Bring an umbrella", and nothing regarding bringing an umbrella would be posted to the blackboard database 150. However, the situation semantic object indicating "not bad weather" would be true, and the action semantic object may be selected from among many action semantic objects associated with the situation "not bad weather", such as action semantic objects indicating "Don't worry about it" or "No need to dress for bad weather".

Context information may also be retracted from the blackboard. For example, if "bad weather" or humidity greater than 100% and a wind speed greater than 30 mph was previously posted to the blackboard database 150, but a new humidity reading is less than 100% and/or a new wind speed is less than 30 mph, the situational semantic object "bad weather" would be retracted from the blackboard database 150.

It is important that context information is posted to the blackboard database 150 in distinct states to avoid cycles, such that queries to the blackboard database 150 do not end up an endless loop. According to an illustrative embodiment, cycles are avoided by stacking the situation semantic objects and paired action semantic objects as distinct blackboard states. Otherwise, a system trace is performed, and the last paired action semantic object is replaced to break a cycle or an incorrect action semantic output. In this manner, action semantic objects provide acyclic feedback which causes situational semantic objects to be fired (i.e., paired with action semantic objects) until a tagged action semantic object is encountered. An action semantic object may be tagged manually in advance, e.g., by inserting a stop code. When the tagged action semantic object is encountered, the blackboard database 150 is updated, and the iteration is ended.

If there are subsequences of the input NL sentential form that are not mapped to respective matching semantics after querying the blackboard database 150 and/or external systems for context information, the mapper 130 is configured to assign a semantic to each subsequence and/or the entire NL sentential form. The mapper 130 may be configured to assign a semantic that is associated with an equivalent NL sentential form, i.e., a metaphor, to the input NL sentential form. For example, if there is no situation semantic object corresponding to "bad weather", but there is a situation semantic object indicating "not hospitable weather", the mapper 130 may assign the action semantic object advising the user "You wouldn't want to be out in the weather today".

In another embodiment, if there are subsequences of the input NL sentential form that are not mapped to respective matching semantics after querying the blackboard database 150 and/or external systems for context information, the mapper 130 is configured to assign a semantic associated with a nearest matching NL sentential form to the input NL sentential form. A nearest match is based on maximizing the percentage of shared semantic objects between two NL sentential forms. For example, if there is no situation semantic object corresponding to "bad weather", but there is a situation semantic object corresponding to "not nice weather" the mapper 130 may assign the action semantic object indicating "It's not nice weather, so wear a raincoat".

In yet another embodiment, if there are subsequences that are not mapped to respective matching semantics after querying the blackboard database 150 and/or external systems for context information, the mapper 130 is configured to cause an external system and/or the user to be queried for matching semantics. The returned matching semantics are then assigned to the subsequences.

Every unknown subsequence is stored in a hashed cache (not shown FIG. 1 in the interest of simplicity of illustration). If a longest unknown subsequence is found in a hashed cache by the mapper 130, the mapper is configured to map the unknown subsequence with a matching semantic and stores the association of the subsequence with the matching semantic in the hash table 140. In this manner, the unknown subsequence becomes "known".

Queries are issued for the semantics of every unknown subsequence as well as the associated component function language components. Subsequences, such as phrases, are only associated with computer language function components in the context of their containing sentential form, since the presence of other subsequences in the sentential form can determine the matching semantics.

By querying the external system, the computing device 120 learns context information and thus builds its knowledge base of semantics that are related to NL sentential forms.

Once a matching semantic is mapped to an input NL sentential form, the translator 160 is configured to translate the matching semantic back into a NL sentential form. Semantic objects are inverse-hashed to many NL sentential forms, and the non-determinism in the translation, where applicable, is resolved by chance. Resulting incorrect sentences are associatively mapped to their acquired non-deterministic corrections.

That is, once a matching situation semantic object is paired or hashed with action semantic objects, the translator 160 is configured to translate the action semantic objects into translated NL sentential forms that define respective actions to take in case the situation is true. The translator 160 is further configured to select a translated NL sentential form by chance from among the many translated NL language sentential forms and outputs the selected translated NL sentential form for correction, as appropriate.

Using the example above, if the context information on the blackboard database 150 indicates that the weather is bad, the translator 160 translates the action semantic objects indicating that the user should "Wear a raincoat" or "Bring an umbrella" into NL sentential forms and selects from among the translated NL sentential forms. The selected translated NL sentential form, e.g., "Bring an umbrella", may be output via the user interface 110 for verification or correction. If the output is not correct, the user may provide a corrected action, and a corrected action semantic object will be paired with the situation semantic object. The paired corrected action semantic object and situation semantic object will be stored in the hash table. For example, if the user is instructed to bring an umbrella, but the user looks out the window and realizes it's really windy, the user may respond "It's too windy for an umbrella, but I need to wear rain boots". In this case, the action semantic object indicating that the user should "bring an umbrella" may be deleted as an action semantic object associated with the situation semantic object indicating "bad weather", and "Wear rain boots" may be added as an action semantic object paired with the situation semantic object indicating "bad weather". By associating the appropriate semantics with NL sentential forms, the computing device 120 builds upon its knowledge base of natural language.

As can be understood from the example above, the computer-based learning system 100 may be used as an intelligent (self-referential) question-answering wizard using natural language. That is, as described above, a question that is input as a NL sentential form to the computing device 120 via the user interface 110 may be mapped to matching semantics and translated into NL responses, one of which may be selected as a response to output to the user.

To provide for cybersecurity for the computer-based learning system 100, the computer language function components stored in the computer language function component database 170 are checked from time to time by a cybersecurity system. The cybersecurity system may query the computer language function component database 170 via any suitable wired or wireless connection to validate the stored computer language function components. The computing device 120 includes an input/output interface configured to receive such queries and output the stored computer language function components. Validation of the computer language function components is described in further detail below with reference to FIG. 3.

Figure 2A:
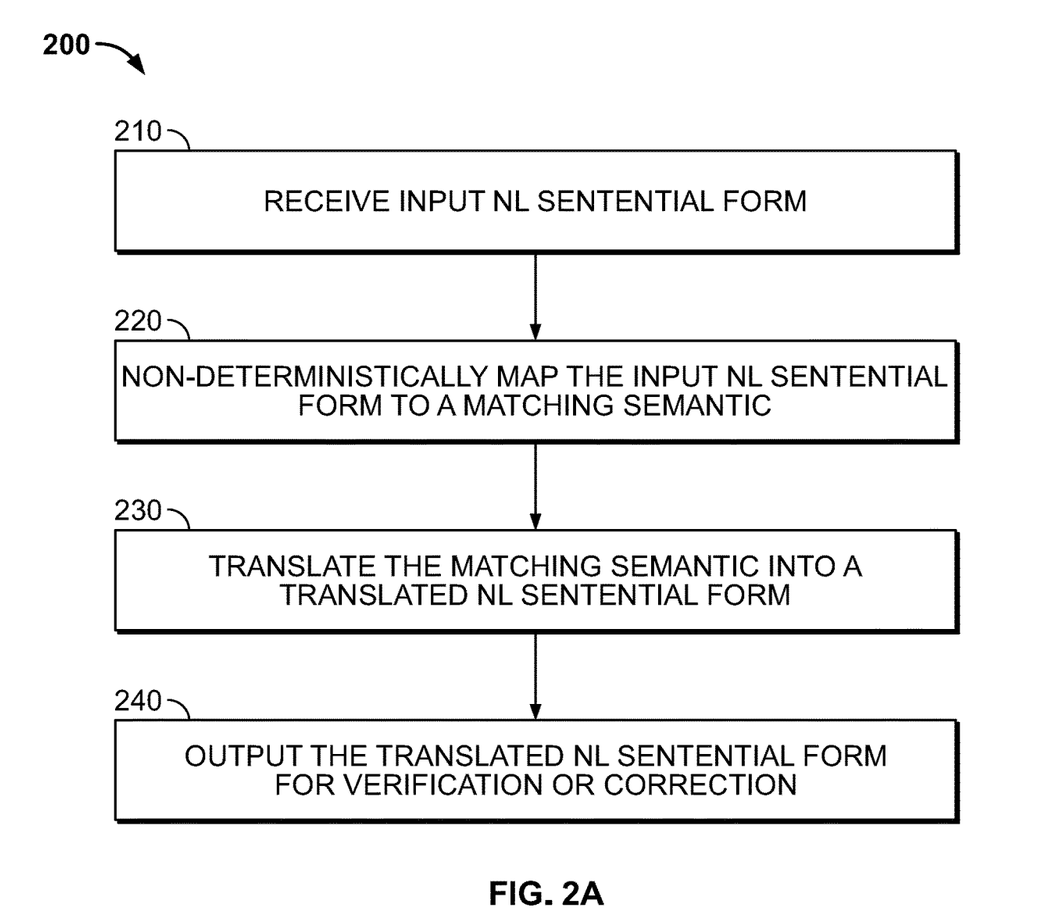
FIG. 2A illustrates a flow chart showing steps in a process for learning a natural language by a computing device according to an illustrative embodiment.
Figure 2B:
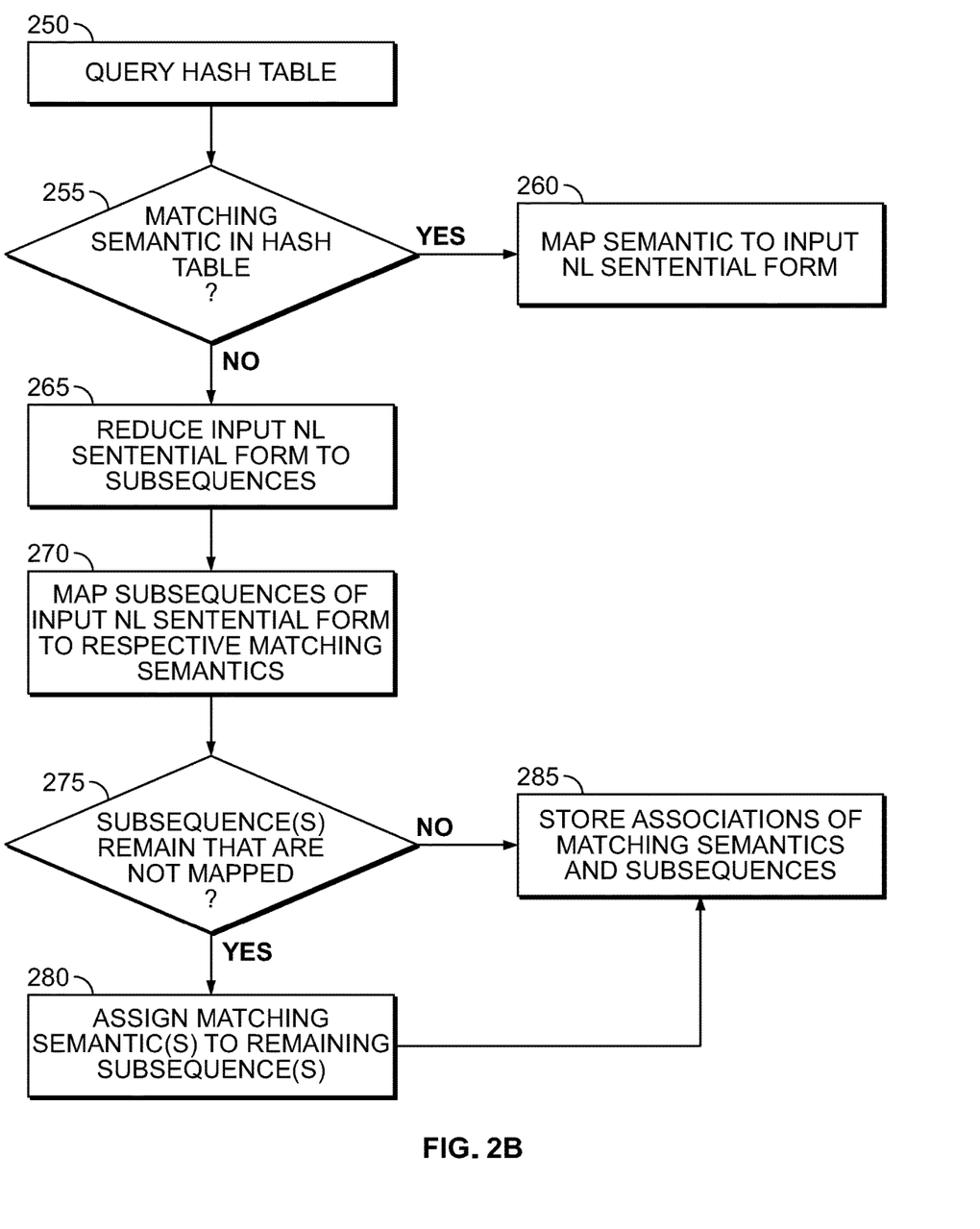
FIG. 2B illustrates a flow chart showing details of the mapping step shown in FIG. 2A according to an illustrative embodiment.

Turning now to an explanation of the process involved in learning NL sentential forms, FIG. 2A is a flow chart showing steps in a process for learning a natural language by a computing system according to illustrative embodiments. FIG. 2B is a flow chart showing details of a mapping step shown in FIG. 2A. It should be appreciated that the steps and order of steps described and illustrated in FIGS. 2A and 2B are provided as examples. Fewer, additional, or alternative steps may also be involved and/or some steps may occur in a different order.

Referring to FIG. 2A, the process 200 begins at steps 210 at which an input NL sentential form is received, e.g., by the mapper 130 shown in FIG. 1. At step 220, the mapper non-deterministically maps the input NL sentential form to a matching semantic. Many different input NL sentential forms that have similar meanings may be mapped to the same matching semantic. Steps involved in mapping are shown in FIG. 2B and described in detail below.

At step 230, the matching semantic is translated into a NL sentential form, e.g., by the translator 160 shown in FIG. 1. As many different NL sentential forms may be mapped to the same matching semantic, there may be many choices for the translated NL. The translated NL form may be resolved by chance, i.e., by selecting from among the many choices for the translated NL sentential by chance. The translated NL sentential form may be output to the user for verification and/or correction at step 240. In response to a user correction, the process 200 may repeat.

Referring to FIG. 2B, details of the step 220 for mapping are shown. At step 250, a hash table, e.g., the hash table 140 shown in FIG. 1, is queried. At step 255, a determination is made, e.g., by the mapper 130 shown in FIG. 1, whether there is an association of a matching semantic with an input NL sentential form in the hash table. If the entire sentential form is known and another semantic object is not now desired, then at step 260, the input NL sentential form is associatively and non-deterministically mapped to the semantic situational object and paired computer language function component.

Otherwise, at 265, the input NL sentential form is reduced to subsequences, e.g., by iteratively and sequentially searching the input NL sentential form from left to right for ever-shorter subsequences that are associated with respective matching semantics. At step 270, the subsequences are mapped to respective matching semantics. This involves destructively and non-deterministically replacing the subsequences with the respective matching semantics (using the blackboard database 150 as an intermediary). Any remaining subsequences, i.e., words, such as "and", "the", etc., are left as "glue codes" for the NL sentential form, and no attempt is made to match these with semantics.

At step 275, a determination is made whether any meaningful subsequences, i.e., subsequences other than "glue codes", remain that are not mapped. This may be the case if all the subsequences have not been mapped or if the NL sentential form cannot be further reduced to meaningful subsequences. If not, the mapped associations of subsequences and respective matching semantics are stored in the hash table at step 285.

If meaningful subsequences do remain that have not been mapped, the matching semantic may be assigned to the remaining subsequence(s) at step 280. This may be achieved by assigning semantics that are associated with an equivalent NL sentential form as the matching semantic for the subsequences, assigning a semantic that is associated with a nearest matching NL sentential form as the matching semantic for the subsequences, or querying the user and/or another intelligent system for an appropriate semantic to assign as the matching semantic for the subsequences. The associations of the assigned matching semantics to the subsequences are stored in the hash table at step 285.

Although not shown in FIG. 2B, it should be appreciated that NL sentential forms (including entire sentences and/or subsequences) that are not mapped may be stored in a hashed cache until they are mapped.

Figure 3:
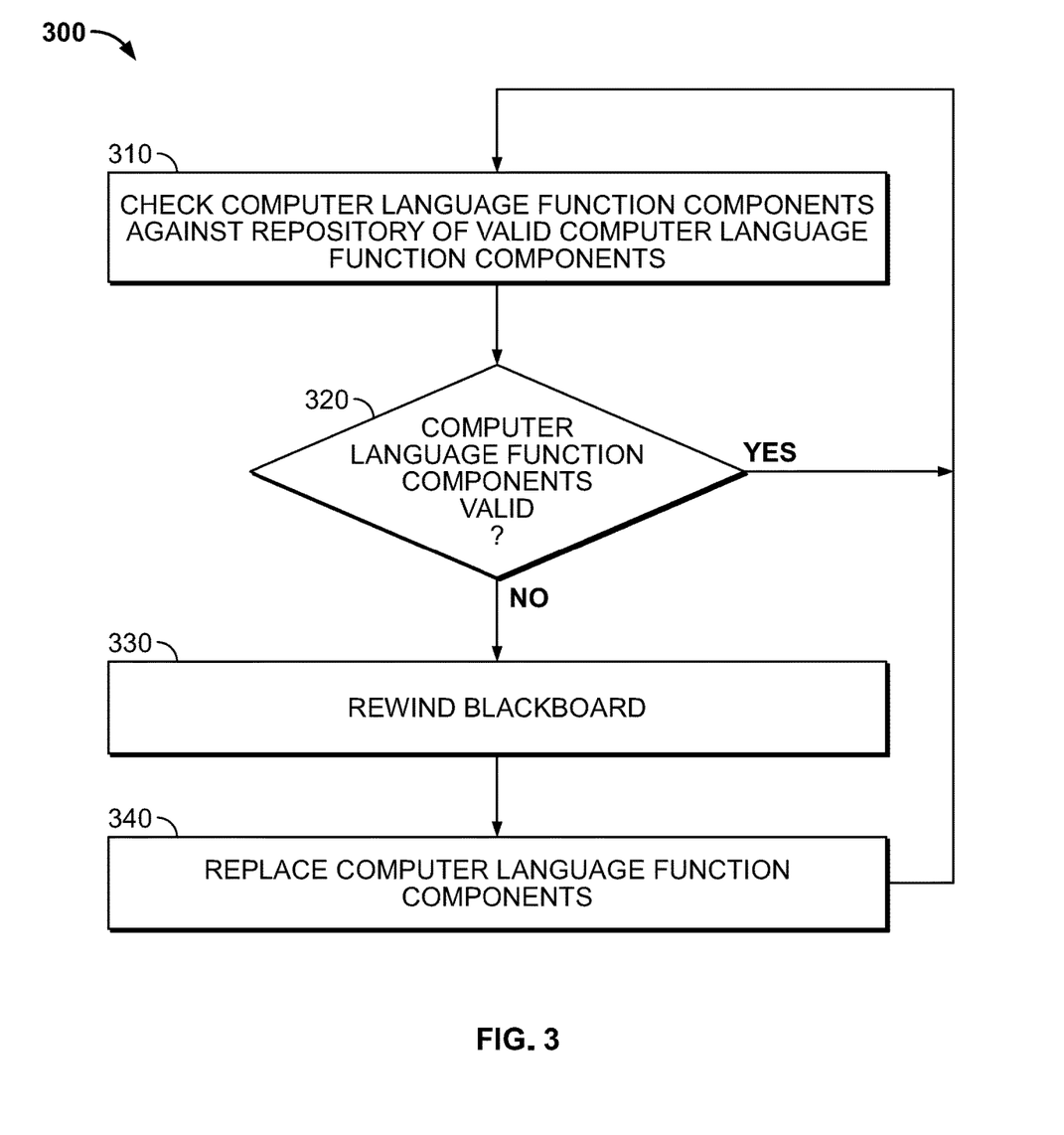
FIG. 3 illustrates a flow chart showing steps in a process for cyber-secure static code analysis according to an illustrative embodiment.

Turning now to the security concerns, according to an illustrative embodiment, cybersecurity is realized through static code analysis. This may be understood with reference to FIG. 3 which illustrates a flow chart showing steps in a process for cyber-secure static code analysis according to an illustrative embodiment. As shown in FIG. 3, the process 300 begins at step 310 with checking the code contained in the computer language function components stored, e.g., in the computer language function component database 170 shown in FIG. 1, against valid code contained in computer language function components stored in an external repository. The external repository may only be written to under controlled (secure) conditions using a capability access model. Step 310 may be performed by any suitable computer-based device that queries the computer language function component database 170 via a wired or wireless connection.

At step 320, a determination is made whether the computer language function components stored in the computer language function component database 170 are valid, i.e., whether they are the same or equivalent to the valid computer language function components stored in the external repository. If so, the process returns to step 310 and is repeated, e.g., with a predetermined frequency. The frequency with which the computer language function components stored in the computer language function component database 170 are checked against valid computer language function components determines the degree of cybersecurity that can be attained.

If it is determined at step 320 that the computer language function components are not valid, the states of the blackboard database 150 are rewound at step 330, and the compromised computer language function components are replaced with the valid computer language function components from the repository at step 340. This process makes the computer-based learning system 100 shown in FIG. 1 self-restoring in the event of a cyber-attack.

The process depicted in FIG. 3 may be performed by a computing device that is external to the computer-based learning system 100 shown in FIG. 1. The computing device for performing secure static code analysis may be similar to that shown in FIG. 4 and described below.

Figure 4:
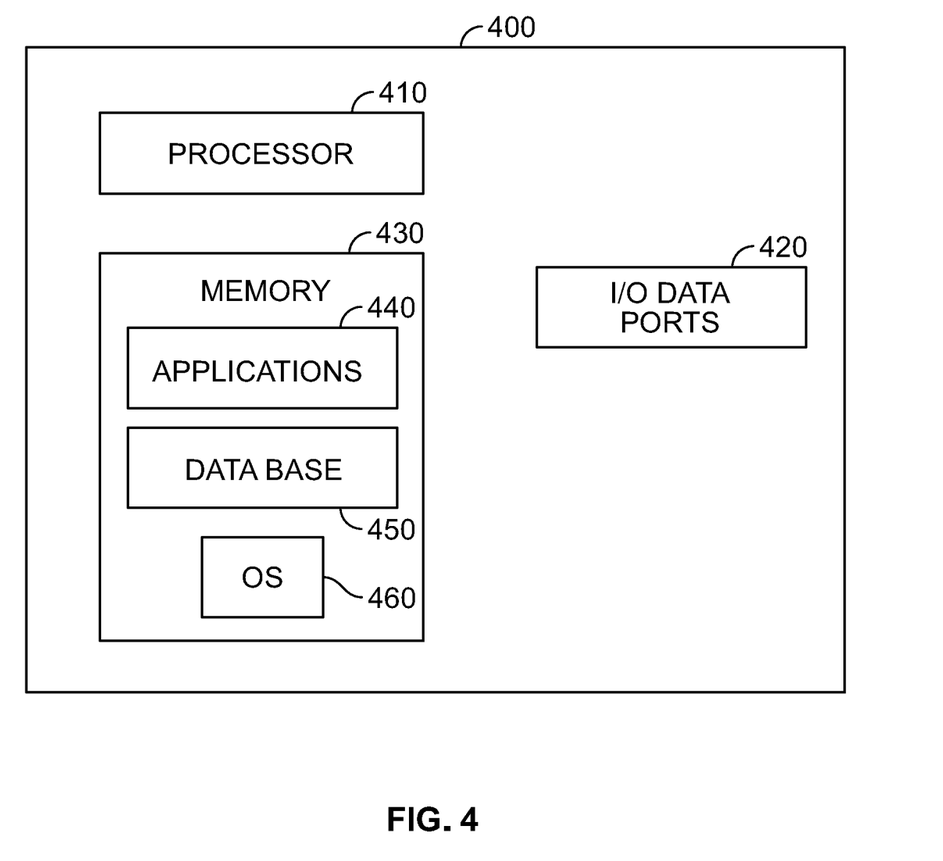
FIG. 4 illustrates a computing device that may be used in a system for learning a natural language according to an illustrative embodiment.

FIG. 4 is a block diagram of a computing device which may be used for learning natural language and/or performing static code analysis according to illustrative embodiments. Although no connections are shown between the components illustrated in FIG. 4, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 4, the computing device 400 may be implemented in any suitable computing device, e.g., a consumer laptop. The computing device 400 includes a processor 410 that receives inputs and transmits outputs via input/output (I/O) Data Ports 420. The I/O Data Ports 420 can be implemented with, e.g., any suitable interface through which data may be received and transmitted wired and/or wirelessly. For example, in the case of the computing device 120 shown in FIG. 1 being implemented with the computing device 400, the inputs may include NL sentential forms, responses to queries, corrected computer language function components, etc. Outputs may include, for example, queries to external systems for context information, responses to user questions, and computer language function components to be analyzed for security.

Although not shown, the computing device 400 may also include a physical hard drive. The processor 410 communicates with the memory 430 and the hard drive via, e.g., an address/data bus (not shown). The processor 410 can be any commercially available or custom microprocessor. The memory 430 is representative of the overall hierarchy of memory devices containing the software and data used to implement the functionality of the computing device 400. The memory 430 can include, but is not limited to the types of memory devices described above. As shown in FIG. 4, the memory 430 may include several categories of software and data used in the computing device 400, including applications 440, a database 450, an operating system (OS) 460, etc.

The applications 440 can be stored in the memory 430 and/or in a firmware (not shown) as executable instructions, and can be executed by the processor 410. The applications 440 include various programs that implement the various features of the computing device 400. For example, in the case of the computing device 120 shown in FIG. 1 being implemented with the computing device 400, the applications 440 may include applications to implement the functions of the mapper 130 and the translator 160 shown in FIG. 1 (including mapping a NL sentential form to a matching semantic, querying the blackboard database 150 and/or external systems, translating the matching semantic into natural language, etc.).

The database 450 represents the static and dynamic data used by the applications 440, the OS 460, and other software programs that may reside in the memory. The database 450 may be used to store various data including data needed to execute the applications 440. For example, in the case of the computing device 120 shown in FIG. 1 being implemented with the computing device 400, the database 450 may store, e.g., associations of situation semantic objects paired with action semantic objects, associations of computer language function components with situation semantic objects and action semantic objects, context information, computer language function components to be checked for security. Although one database 450 is shown, it should be appreciated that the database 450 represents one or more databases that correspond to the hash table 140, the blackboard database 150, and the computer language function component database 170 shown in FIG. 1.

While the memory 430 is illustrated as residing proximate the processor 410, it should be understood that at least a portion of the memory 430 can be a remotely accessed storage system, for example, a server on a communication network, a remote hard disk drive, a removable storage medium, combinations thereof, and the like.

It should be understood that FIG. 4 and description above are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

Further, although FIG. 4 shows an example of a computing device with which the computing device 120 and a cyber-security analyzing device may be implemented, those skilled in the art will appreciate that there may be other computer system configurations, including, for example, multiprocessors, parallel processors, virtual processors, distributed computing systems, microprocessors, mainframe computers, and the like.

According to the illustrative embodiments described above, the cost of knowledge acquisition is minimized through the representation and translation of knowledge expressed in natural language. The system converges on intelligent natural conversational discourse, learning, and programming. These embodiments may be considered to be derived from functional programming, which is ideally suited to the realization of parallel processing.

The natural language learning system and method described herein can bootstrap the specification of domain-specific computer language function components using natural language. This potentially moves programming from the arduous context-free chore it is today to the user-friendly context-sensitive specification made possible through the abstract use of natural language. Such natural language programming is applicable to the interactive and rapid reconfiguration of mission parameters using programmable assets.

Moreover, the natural language learning system and method described herein are cyber-secure and self-restoring in the event of a cyber-attack.

As described above, one application of the natural language learning system and method described herein may be a question-answering wizard for use in functional specification/modification. Another application may the natural language programming of a mission assigned to an unmanned vehicle, e.g., a quadcopter having a capability for machine vision. Those skilled in the art will appreciate that there may be many other useful applications of the natural language learning system and method described herein.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for learning a natural language by a computing device, comprising:
storing associations of natural language sentential forms and semantics in a hash table, wherein the semantics are associated with respective computer language function components;
storing context information corresponding to the semantics in a blackboard database;
non-deterministically mapping, by a mapper included in the computing device, an input natural language sentential form to a matching semantic that is associated with a computer language function component by querying the hash table for the matching semantic associated with the input natural language sentential form;
querying the blackboard database for the context information corresponding to the matching semantic if the matching semantic is not found in the hash table;
querying an external system for information corresponding to the matching semantic if the matching semantic is not found in the hash table and the blackboard database does not contain the context information corresponding to the matching semantic;
assigning a semantic that is associated with an equivalent natural language sentential form to the input natural language sentential form if there is no matching semantic associated with the input natural language sentential form;

translating, by a translator included in the computing device, the matching semantic into a translated natural language sentential form.

2. The method of claim 1, wherein mapping further comprises reducing the input natural language sentential form to subsequences and mapping the subsequences to respective matching semantics if no matching semantic is found in the hash table.

3. The method of claim 2, wherein mapping the subsequences comprises querying a blackboard database for context information corresponding to the respective matching semantics.

4. The method of claim 2, further comprising assigning semantics to the subsequences if subsequences remain for which there are no respective matching semantics.

5. The method of claim 1, wherein many input natural language sentential forms are mapped to the matching semantic and wherein translating comprises inverse-hashing the matching semantic to many natural language sentential forms.

6. The method of claim 5, wherein translating further comprises selecting the translated natural language sentential form by chance from among the many natural language sentential forms.

7. A computing device for learning a natural language, comprising:
a hash table configured to store associations of natural language sentential forms and semantics, wherein the semantics are associated with respective computer language function components;
a blackboard database configured to store context information corresponding to the semantics;
a mapper configured to non-deterministically map an input natural language sentential form to a matching semantic by querying the hash table for the matching semantic and, if the matching semantic is not found in the hash table, querying the blackboard database for the context information corresponding to the matching semantic, wherein the mapper is further configured to query an external system for information corresponding to the matching semantic if the matching semantic is not found in the hash table and the blackboard database does not contain the context information corresponding to the matching semantic, and wherein the mapper is further configured to assign a semantic that is associated with an equivalent natural language sentential form to the input natural language sentential form if there is no matching semantic associated with the input natural language sentential form; and
a translator configured to translate the matching semantic into a translated natural language sentential form.

8. A computing device for learning a natural language, comprising:
a hash table configured to store associations of natural language sentential forms and semantics, wherein the semantics are associated with respective computer language function components;
a blackboard database configured to store context information corresponding to the semantics;
a mapper configured to non-deterministically map an input natural language sentential form to a matching semantic by querying the hash table for the matching semantic and, if the matching semantic is not found in the hash table, querying the blackboard database for the context information corresponding to the matching semantic, wherein the mapper is further configured to query an external system for information corresponding to the matching semantic if the matching semantic is not found in the hash table and the blackboard database does not contain the context information corresponding to the matching semantic, and wherein the mapper is further configured to assign a semantic associated with a nearest matching natural language sentential form to the input natural language sentential form if there is no matching semantic associated with the input natural language sentential form; and
a translator configured to translate the matching semantic into a translated natural language sentential form.

9. The computing device of claim 7, wherein the semantics include situation semantic objects paired with action semantic objects, each of the situation semantic objects and action semantic objects being associated with respective computer language function components.

10. The computing device of claim 7, further comprising an input/output interface configured to output the respective computer language function components for checking against valid computer language function components to provide for cyber-security.

* * * * *